United States Patent [19]

Butler et al.

[11] Patent Number: 4,894,920

[45] Date of Patent: Jan. 23, 1990

[54] TREAD HEIGHT MEASURING DEVICE

[75] Inventors: Kim D. Butler, San Angelo; Wesley H. Gibbs, Bronte; Teddy J. Holt; James L. Lee, both of San Angelo, all of Tex.

[73] Assignee: The Goodyear Tire & Rubber Company, Akron, Ohio

[21] Appl. No.: 238,785

[22] Filed: Aug. 31, 1988

[51] Int. Cl.⁴ .......................... G01B 3/22; G01B 3/28
[52] U.S. Cl. .................................. 33/203.11; 33/833; 33/836; 33/556
[58] Field of Search ............ 33/169 B, 169 R, 172 R, 33/193, 203.11

[56] References Cited

U.S. PATENT DOCUMENTS

| | | | |
|---|---|---|---|
| 397,286 | 2/1889 | Hansel | 33/169 R |
| 504,278 | 8/1893 | Preston | 33/169 B |
| 1,922,895 | 8/1933 | LeMaire | 33/169 B |
| 2,271,217 | 1/1942 | Allen et al. | 33/172 R |
| 2,287,273 | 6/1942 | Rabb | 33/169 |
| 2,550,508 | 4/1951 | Wiedemer | 33/169 |
| 2,560,571 | 7/1951 | Hawkins | 33/172 |
| 2,650,437 | 9/1953 | Glynn | 33/169 R |
| 2,654,156 | 10/1953 | Boyer | 33/172 |
| 2,687,574 | 8/1954 | Heal | 33/169 |
| 2,799,940 | 7/1957 | Nagle et al. | 33/172 R |
| 3,017,702 | 1/1962 | Hercules | 33/172 R |
| 3,063,154 | 11/1962 | Slavsky | 33/169 |
| 3,170,243 | 2/1965 | Williams | 33/169 |
| 3,183,481 | 5/1965 | McCrory | 340/52 |
| 3,269,019 | 8/1966 | Krohn | 33/169 |
| 3,352,018 | 11/1967 | Mazeika | 33/169 |
| 3,645,002 | 2/1972 | Hefti | 33/169 B |
| 3,911,586 | 10/1975 | Malonda | 33/172 R |
| 3,933,036 | 1/1976 | Lippmann et al. | 73/146 |
| 4,196,616 | 4/1980 | Argabrite et al. | 33/169 B |
| 4,704,802 | 11/1987 | Bennett | 33/172 R |

FOREIGN PATENT DOCUMENTS

| | | | |
|---|---|---|---|
| 347409 | 1/1922 | Fed. Rep. of Germany | 33/172 R |
| 1327850 | 12/1963 | France | 33/169 R |
| 75601 | 6/1980 | Japan | 33/169 B |
| 406606 | 8/1966 | Switzerland | 33/169 B |
| 897611 | 1/1982 | U.S.S.R. | 33/169 B |

Primary Examiner—William A. Cuchlinski, Jr.
Assistant Examiner—Thomas B. Will
Attorney, Agent, or Firm—R. J. Slattery, III

[57] ABSTRACT

An apparatus and/or method of measuring the height of a tread element 52 of a tire. The device 50 spans or straddles the tread element 52 to be measured. Two support members 65,66 are disposed to either side of the tread element to be measured in the adjacent grooves. A housing 54 has two horizontal members 56,58 each attached to the housing 54. The vertical members 64,66 are capable of slidable movement along the horizontal members and are releasably secured thereto. A measuring device 76 is carried by the housing 54 for measuring the height of the tread element with respect to the adjacent grooves.

10 Claims, 2 Drawing Sheets

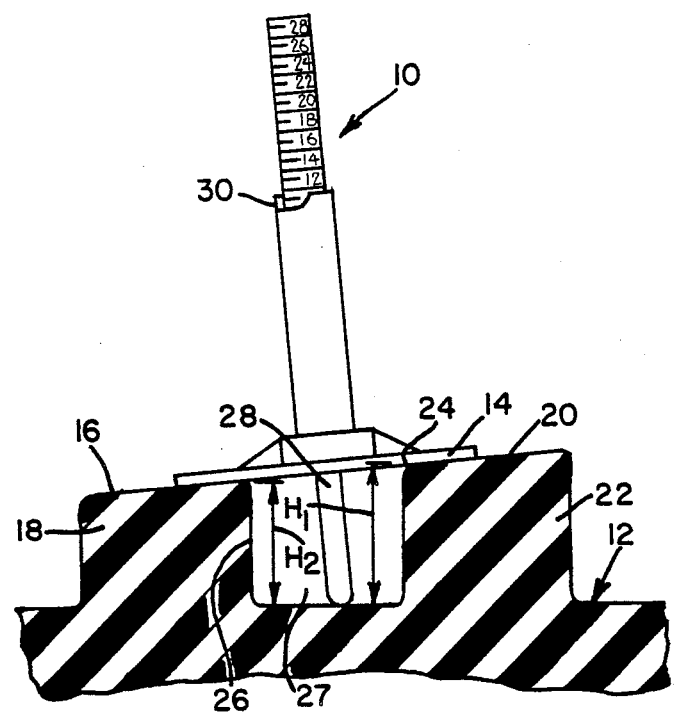
FIG.1 *PRIOR ART*
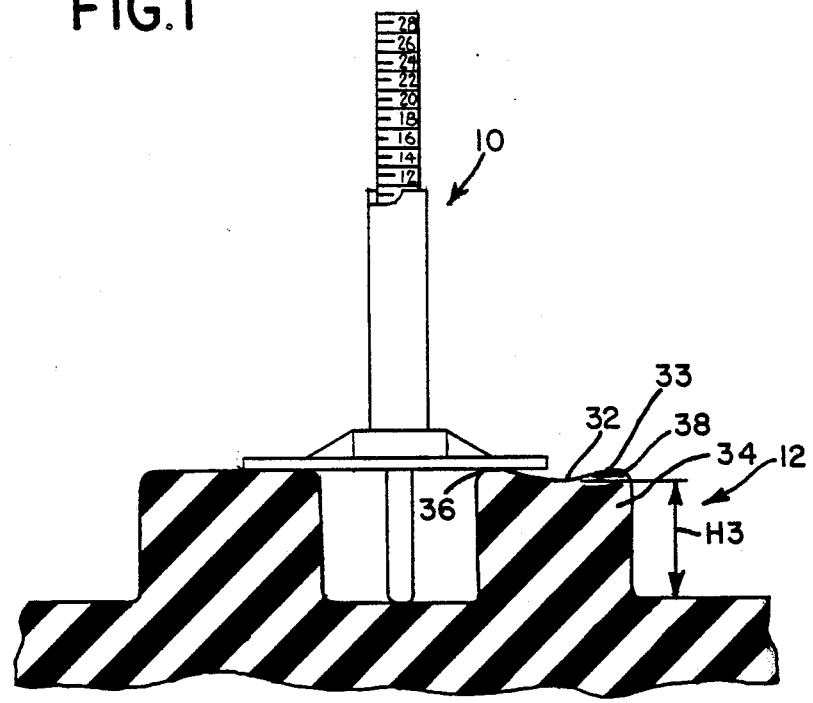
FIG.2 *PRIOR ART*

TREAD HEIGHT MEASURING DEVICE

BACKGROUND OF THE INVENTION

The present invention provides for an apparatus and/or method of measuring the height of a tread element such as a lug, a traction element or a rib of a tire. More specifically, this invention relates to the measuring of the lugs, traction elements or ribs of large tires such as those commonly known as "off-the-road tires" and "agricultural tires".

An ideal tire under ideal conditions would be expected to wear uniformly. For example, after so many miles "X", the tire tread would be expected to wear a certain amount "Y" uniformly across the entire tread surface until the entire surface was worn completely out at the same time. However, this rarely, if ever, happens in the real world. Parts of the tread of a tire may wear more rapidly than other parts due to a number of different known factors such as alignments, over/under inflation, type of operation, the surface they are operated on, etc. This may even be more pronounced with the tread elements for "off-the-road tires" or "agricultural" tires. Generally, as compared to passenger tires, these tires have larger and wider tread elements, lugs, etc., separated by larger and wider grooves. Because of the large tread elements, there is more surface area which may allow for different parts of the same tread element to wear differently. That is, different parts of the tread elements (lugs, etc.) may have different amounts of tread remaining. Prior art measuring gauges have not allowed a person in the field to measure a particular point on a tread element. As a result, these devices may not be accurately measuring that particular lug and/or the remaining tread of the tire. It is important to accurately measure the remaining tread on a tire for both tire testing data and to assure an accurate adjustment or prorated amount on a refund or credit to a customer for the unused portion of the tread.

Generally, the prior art measuring gauges span two adjacent lugs and measure down from there to the bottom of the groove. These devices use the top of the tread elements as the reference point. Therefore, these devices are actually measuring the depth of the grooves.

One such prior art device is disclosed in U.S. Pat. No. 3,269,019 to H W Krohn for a "Tread Depth Gauge". This device has a member which extends across the outer surface of one lug to the outer surface of another lug. A plunger moves down to engage the bottom of the groove. The distance traveled by the plunger corresponds to the depth of the groove. This type of device may not always give the true height of the lug due to the imperfections or the uneven wear of the outer surface on large lugs such as those found on "off-the-road" and "agricultural" tires.

While this invention is related especially for use with "off-the-road" and "agricultural" tires, it is noted that this device and/or method can also be used with other tires such as passenger tires, truck tires, terra tires, etc.

SUMMARY OF THE INVENTION

Therefore, an object of this invention is to provide a measuring device which is especially useful in measuring irregular tread wear and which can readily be used in the field.

It is also an object of this invention to provide a method of measuring tire lugs, traction elements and ribs of tires.

It is an object of this invention to accurately measure the remaining tread on a tire, such as to provide tire testing data and to assure proper adjustment on a refund or credit to a customer for the unused portion of the tread.

It is a feature of this invention to provide a measuring device which can be adjusted to measure the height of a tread element at various points.

It is an advantage of this invention that when irregular or uneven tread wear is present that the claimed invention permits quantification of the irregularity or uneven wear. This may be accomplished by measuring the high and low spots on the tread elements.

In accordance with these and other objects and other aspects and features of this invention, there is disclosed a device for measuring the height of tread elements which spans from one tread groove to another over a tread element. The device has a measuring means which is adjustable to be able to measure the height of various points on the tread element.

The device may include:

two support members which are disposed to either side of the tread element (lug, rib traction elements, etc.) to be measured;

a spacing means disposed between and attached to said support members for providing separation between said vertical members; and a measuring means carried by said spacing means for providing height information of said tread element.

There is also disclosed in accordance with this invention a method of measuring the height of a tread element (lug, rib, traction element, etc.). This includes placing a pair of support members of a height gauge to either side of the tread element to be measured such that the measuring device straddles the tread element. Positioning a measuring means of the gauge over the portion of the outer surface of the tread element to be measured. Actuating the measuring means to measure the height of the outer surface of the traction element.

This procedure can be repeated for different portions of the tread element or for other tread elements of the tire. The height measurements then can be compared with previous measurements or the known heights of the tire when new. The actual measured heights may also be compared to the predicted heights of that type of tire for the actual miles driven on the tire.

DESCRIPTION OF THE DRAWINGS

The following is a brief description of the drawings in which like parts bear like reference numerals and in which:

FIG. 1 is an elevational view of a prior art measuring device in use in measuring the tread depth, the tread being in a partial section;

FIG. 2 is an elevational view of the prior art measuring device of FIG. 1 as used in measuring the depth of another tread element in partial section.

DETAILED DESCRIPTION OF THE INVENTION

Figure 3:
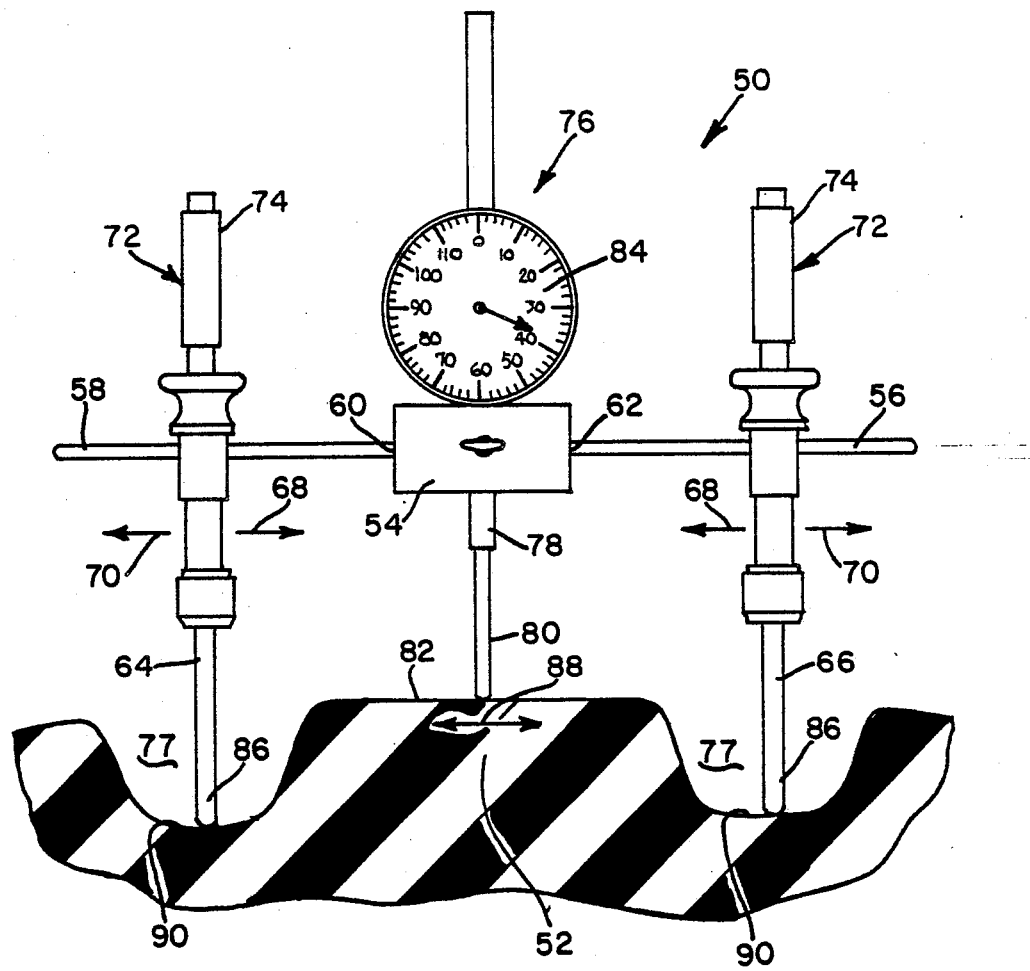
FIG. 3 is an elevational view of a measuring device in accordance with one aspect of the invention for use in measuring a tread element, the tread being in a partial sectional elevation.

Now referring to FIGS. 1 and 2, there is illustrated a prior art device 10 for use in measuring the depth of the tread 12 of a tire. The gauge has a member 14 which extends across the outer surface 16 of one tread element 18 to the outer surface 20 of the next adjacent tread element 22. As used herein, including the claims, a tread element includes lugs, traction elements, ribs, etc., of a tire tread. "Outer" means toward the exterior of the tire as opposed to "inner" which means toward the inside of the tire. If the outer surfaces 16,20 of the tread elements are both relatively flat and horizontal, the resulting measurement will be accurate. However, if the outer surfaces 16,20 have been worn such that one edge 24 has a height H1 which is different than the height H2 of opposite edge 26, the gauge will not be perpendicular to the base of the groove 27. This causes the plunger 28 to be angled in the groove 27 and the resulting height measurement 30 will not be the true height of the tread element 16 or 20.

Another problem arises when an inner portion 32 of the outer surface 33 of a tread element 34 is lower than the outer edges 36 and 38. This reading does not provide a true height of the traction element which is more properly shown as H3.

Referring now to FIG. 3, there is illustrated a measuring device according to one aspect of the invention shown generally as reference numeral 50. The measuring device straddles the tread element 52 which is to be measured.

A housing 54 has two diametrically opposed horizontal members 56,58 each attached at one end 60,62 to the housing. The horizontal members 56,58 may be bars or rods and may be attached by various means, such as by screwing them into the housing 54. Perpendicularly from each horizontal member 56,58 extends a vertical member 64,66 The vertical members 64,66 are each capable of slidable movement along the horizontal members as illustrated by arrows 68 and 70. A means for releasably securing the vertical members to said horizontal members is provided at 72.

The means 72 for releasably securing, the vertical 64,66 members to the horizontal members 56,58 is to allow the vertical members to be adjusted or slid 68,70 along the horizontal members until the desired location is reached and then the vertical members are locked into place. This allows the measuring device to compensate for different sizes of traction elements It further allows for the positioning of the measuring means as will be discussed below. Various different means 72 could be used to secure and unsecure the vertical members. One such means is a set screw arrangement where a knob 74 engages or actuates a set screw (not shown) to engage the horizontal member, thereby preventing horizontal movement The horizontal members 56,58 and the housing 54 are spaced a predetermined distance from the tread element by the vertical members 64 and 66. A measuring means 76 may be carried by the housing 54 for determining the height of the tread element with respect to the tread grooves 77.

The measuring means 76 may include a housing 78 which extends through housing 54 and is attached thereto. A moveable probe member 80 which is carried by the housing is capable of extending and retracting from the housing 78. A biasing means 79, such as a spring, is carried by the housing 78 to extend the moveable member from the housing 78 and engage the outer surface road engaging portions 82 of the tread element 52. An indicating means 84 such as a dial indicator, digital read out, stem type with graduated markings, etc., provides an indication of the height of the tread element. The indicating means 84 is coupled to said moveable member such that as the force of the biasing means is overcome and the member 80 is retracted, this movement corresponds to the height of the traction element. For example, the moveable probe member may have a fully extended position which is in the same horizontal plane as the lower or second ends 86 of the vertical members 64,66 and the retraction of the movable member corresponds to the height of the tread element. Although not to be limited thereto, one measuring means having a dial indicating means that may be used with this invention is commercially available from Mitutoyo.

In operation, the measuring device is placed between a pair of grooves 77 to straddle a tread element (traction element, lug, rib, etc.) which is to be measured. The measuring means 76 is placed over the portion of the top 82 of the tread element to be measured. The measuring means is adjusted horizontally 88 by releasing the securing means 72 for each vertical member 64,66. This allows the horizontal members 56,58 to slide through the vertical members 64,66 until the measuring means is properly positioned. The securing means can then be tightened to prevent any slidable movement of the members. The degree of movement of the movable probe member 80 from the housing 78 corresponds to the height of the portion of the tread element measured above the bottom portion 90 of the grooves 77 which can be read from the indicating means 84.

This procedure may then be repeated for different areas or portions of the same tread element, such as for measuring for irregular wear. The above procedure may be repeated for a number of tread elements of the tire and may be further compared to previous measurements of the tread elements of the tire or to the original heights of the tread elements of the tire when new. This latter comparison could result in a determination of the amount of wear, percentage worn, etc., of the tire or the remaining life of the tire.

While certain representative embodiments and details have been shown for the purpose of illustrating the invention, it will be apparent to those skilled in this art that various changes and modifications may be made therein without departing from the scope of the invention.

We claim:

1. A device for measuring the height of a tread element of a tire comprising:
   two support members which are to be disposed to either side of the tread element to be measured;
   a spacing means disposed between and attached to said support members for providing separation between said support members;
   a measuring means carried by said spacing means for providing height information of said tread element; and
   wherein said support members are releasably and movably attached to said spacing means.

2. The device of claim 1 wherein said measuring means comprises:
   a housing;
   a movable member capable of extending and retracting from said housing to contact a top portion of said tread element wherein the height of said tread element is indicated by the movement of said movable member.

3. The device of claim 2 wherein said measuring means further comprises a means for visually indicating the height of said tread element.

4. A device for measuring the height of tread elements between a pair of grooves of the tread of a tire to determine the amount of wear of such tread elements comprising:
   (a) spacing means adapted to span the tread element;
   (b) two support means slidably attached to said spacing means, one support means engaging one said groove and the other support means engaging the other said groove, said support means disposing said spacing means a predetermined distance from said tread element; and
   (c) a measuring means attached to said spacing means and having a movable member for engaging a portion of said tread element wherein the height of said tread element is indicated by the movement of said movable member.

5. A tire tread element measuring device comprising:
   a housing;
   two diametrically opposed horizontal members, each attached at a first end to said housing;
   two vertical members, one adapted for slidable movement at a first end along one said horizontal member and the other vertical member adapted for slidable movement at a first end along the other said horizontal member, each said vertical members having a second end for engaging a tread groove;
   a means for releasably securing said vertical members to said horizontal members; and
   a measuring means carried by said housing for determining the height of said tread element with respect to the tread groove.

6. The device of claim 5 wherein said measuring means comprises:
   a measuring means housing;
   a movable member capable of extending and retracting from said measuring means housing;
   a biasing means to extend said movable member to engage the top of said tread element to be measured;
   an indication means coupled to said movable member such that as a biasing force of said biasing means is overcome and the movable member is retracted, the indicator denotes the height of the tread element.

7. A method of measuring the height of a tread element of a tire comprising the steps of:
   a) placing a measuring device between pair of grooves to straddle the tread element;
   b) positioning a measuring means of said device having a movable probe member over a portion of the tread to be measured; and
   c) actuating said measuring means such that said probe member moves to engage said portion, wherein the degree of movement corresponds to the height of the portion above a bottom portion of said grooves.

8. The method of claim 7 wherein steps (a) through (c) are repeated for another portion of said tread element.

9. The method of claim 7 wherein steps (a) through (c) are repeated for several tread elements of said tire; and further including the steps of
   determining the original height of said tread elements of said tire when new; and
   comparing the measured heights to the original heights of the tire when new.

10. The method of claim 9 further comprising the steps of
    determining the amount of milage on said tire;
    comparing the measured heights to predicted heights for a similar tire with said amount of milage; and
    determining the amount of excess wear on said measured tire.

* * * * *